(12) United States Patent
Liu

(10) Patent No.: US 8,897,896 B2
(45) Date of Patent: Nov. 25, 2014

(54) CONTROLLING SYSTEM FOR POWER DISTRIBUTION

(75) Inventor: Hsien-Hsun Liu, Taipei (TW)

(73) Assignee: Cyber Power Systems Inc., Taipei (TW)

( * ) Notice: Subject to any disclaimer, the term of this patent is extended or adjusted under 35 U.S.C. 154(b) by 467 days.

(21) Appl. No.: 13/401,127

(22) Filed: Feb. 21, 2012

(65) Prior Publication Data

US 2013/0218362 A1 Aug. 22, 2013

(51) Int. Cl.

| G05B 11/01 | (2006.01) |
|---|---|
| G05B 15/00 | (2006.01) |
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |

(52) U.S. Cl.
USPC .................. 700/17; 700/19; 700/83; 700/286

(58) Field of Classification Search
USPC ........................................ 700/17, 19, 83, 286
See application file for complete search history.

(56) References Cited

U.S. PATENT DOCUMENTS

| 7,171,461 B2 * | 1/2007 | Ewing et al. ................... 709/223 |
| 7,630,186 B2 * | 12/2009 | Reynolds et al. ............. 361/93.1 |
| 7,761,555 B1 * | 7/2010 | Bishel ............................ 709/224 |
| 7,983,795 B2 * | 7/2011 | Josephson et al. ............. 700/276 |
| 8,174,148 B2 * | 5/2012 | Crucs .............................. 307/32 |
| 8,229,602 B2 * | 7/2012 | Montgomery et al. ........ 700/295 |
| 8,341,837 B2 * | 1/2013 | Braunstein et al. ............. 29/854 |
| 8,549,062 B2 * | 10/2013 | Ewing et al. ................... 709/201 |
| 8,674,823 B1 * | 3/2014 | Contario et al. .............. 340/538 |
| 2005/0280970 A1 * | 12/2005 | Reynolds ..................... 361/93.1 |
| 2007/0276548 A1 * | 11/2007 | Uzunovic et al. ............. 700/297 |
| 2010/0214109 A1 * | 8/2010 | Reynolds et al. ............. 340/664 |
| 2011/0015795 A1 * | 1/2011 | Boyer et al. .................. 700/286 |
| 2011/0182012 A1 * | 7/2011 | Hilton et al. ............. 361/679.01 |
| 2012/0265361 A1 * | 10/2012 | Billingsley et al. ........... 700/295 |

* cited by examiner

*Primary Examiner* — Ronald Hartman, Jr.
(74) *Attorney, Agent, or Firm* — Jacobson Holman Hershkovitz PLLC; Abraham Hershkovitz

(57) ABSTRACT

A controlling system has a computer having a controlling interface, a PDU linking to the computer and multiple electric apparatus connected and linking to the PDU and the computer. The PDU has multiple outlets, a turn-off time for each outlet. The controlling interface of the computer presets that the turn-off time for each outlet and has a shut-down option. The shut-down option has outlet numbers, a main time axis, and multiple variable time axes. Each variable time axis has a start time and an end time. A total period of each variable time axis between the start time and the end time is determined according to the shut-down period of the corresponding electric apparatus. The start time and the end time of each variable time axis are adjustable, but the total time thereof is fixed. Once the start times and the end times are determined finally, the turn-off times for the outlet numbers are calculated and further sent to the PDU.

10 Claims, 6 Drawing Sheets

CONTROLLING SYSTEM FOR POWER DISTRIBUTION

BACKGROUND OF THE INVENTION

1. Field of the Invention

The present invention relates to a controlling system for a power distribution unit (hereinafter PDU), especially to a controlling system for a PDU that provides a readable controlling interface for PDU manager to easily set outlet parameters of the PDU.

2. Description of Related Art

To easily shut down and power on multiple computers or server at the same time, a power strip is proposed. The power strip has an AC power input, multiple AC power outlets and a power breaker. The power breaker is serially connected between the AC power input and the multiple AC power outlets. When the power breaker turns on, the AC power source connected to the AC power input is further output to each of the AC power outlets. On the contrary, all AC power outlets are not output the AC power when the power breaker turns off. Therefore, electronic apparatuses respectively connected to corresponding AC power outlets shut down and power on at the same time by turning on or off the power breaker of the power strip. However, parts of the electric apparatuses connected to the power strip have to be shut down or power on respectively. Therefore, an amended power strip further has multiple power breakers. The power breakers are connected to the corresponding AC power outlets to independently power on or off the corresponding AC power outlets. The manager manually switches the power breakers to determine shut-down sequence and power-on sequence for the electric apparatuses.

The power strip provides power breakers for the manager, the manager has to remember the shut-down sequence and the power-on sequence for the electric apparatuses. For large numbers of the electric apparatuses, using the above power strips is not convenient.

Recently, a power distribution unit (hereinafter PDU) is proposed. With reference to FIG. 6, the PDU 50 has an AC power input, multiple AC power outlets 51 and a controlling unit 52. When the AC power input is connected to the AC power source, each of AC power outlets outputs the AC power source. The controlling unit 52 stores parameters including a shut-down time and a power-on time for each AC power outlet 51. The manager previously presets the shut-down times and power-on times of the PDU 50. When the shut-down time is achieved, the controlling unit 52 sequentially interrupts outputting the AC power of the AC power outlets 51 to shut down the electric apparatuses 30 in sequence. Therefore, the PDU 50 can automatically shut down the electric apparatuses 30 in sequence and makes sure that each electric apparatus has enough time to complete a shut-down procedure. When the power-on time is achieved, the controlling unit 52 sequentially outputs AC power source to the AC power outlets to power on the electric apparatuses 30 in sequence. Therefore, the PDU 50 can automatically power on the electric apparatuses 50 in sequence.

Based on the foregoing description, the manager conveniently shuts down and power on the electric apparatuses by using the PDU. However, the shut-down period and the power-on period of each electric apparatus is not fixed, so the manager has to change the parameters of the PDU. Therefore, the PDU has to requires a convenient controlling system to preset parameters.

SUMMARY OF THE INVENTION

The main objective of the present invention is to provide a controlling system for a PDU that provides a readable controlling interface for PDU manager to easily set outlet parameters of the PDU.

The A controlling system has a computer having a controlling interface, a PDU linking to the computer and multiple electric apparatus connected and linking to the PDU and the computer. The PDU has multiple outlets, a turn-off time for each outlet. The controlling interface of the computer presets that the turn-off time for each outlet and has a shut-down option. The shut-down option has outlet numbers, a main time axis, and multiple variable time axes. Each variable time axis has a start time and an end time. A total period of each variable time axis between the start time and the end time is determined according to the shut-down period of the corresponding electric apparatus. The start time and the end time of each variable time axis are adjustable, but the total time thereof is fixed. Once the start times and the end times are determined finally, the turn-off times for the outlet numbers are calculated and further sent to the PDU.

Since each of the variable time axes is adjusted according to actual turn-off or turn-on period of the corresponding electric apparatus, a manager easily changes the start time or the end time of each variable time axis to determine a turn-off sequence or turn-on sequence of the electric apparatuses connected to the PDU. Therefore, the controlling interface is readable.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
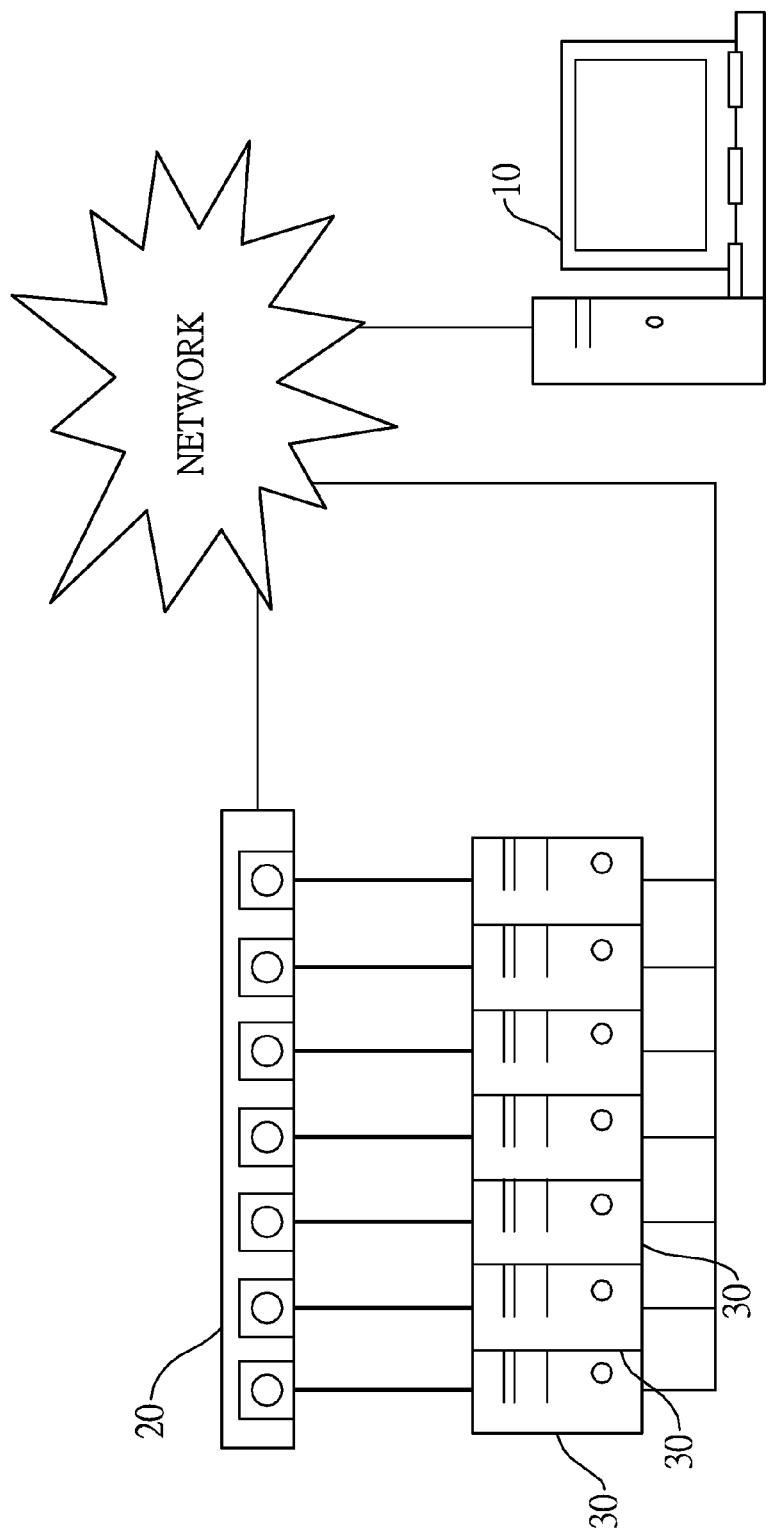
FIG. 1 is a schematic view of a controlling system for a PDU in accordance with the present invention.
Figure 3:
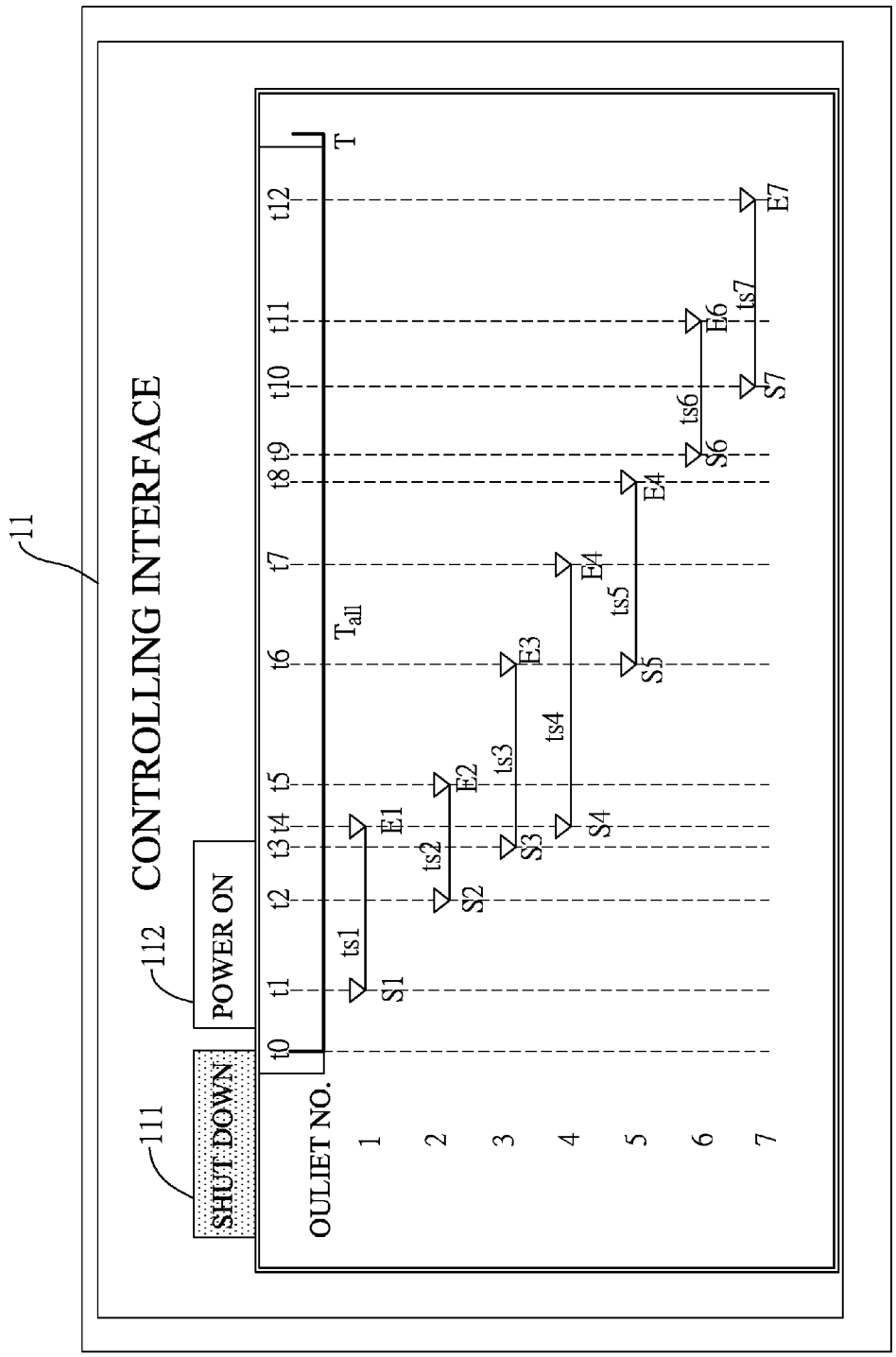
FIG. 3 is a diagram of a controlling interface showing a shut-down procedure in accordance with the present invention.

With reference to FIGS. 1 and 3, a controlling system in accordance with the present invention has a computer 10, a power distribution unit (PDU) 20 and multiple electric apparatuses 30. The computer 10 has a controlling interface 11 and links to a network such as Internet or Intranet. The PDU 20 and the electric apparatuses 30 respectively link to the computer 10 through the network. The electric apparatuses 30 are connected to the PDU 20 to have AC power source and linking to the PDU to obtains shut-down command or power-on command from the PDU.

Figure 2:
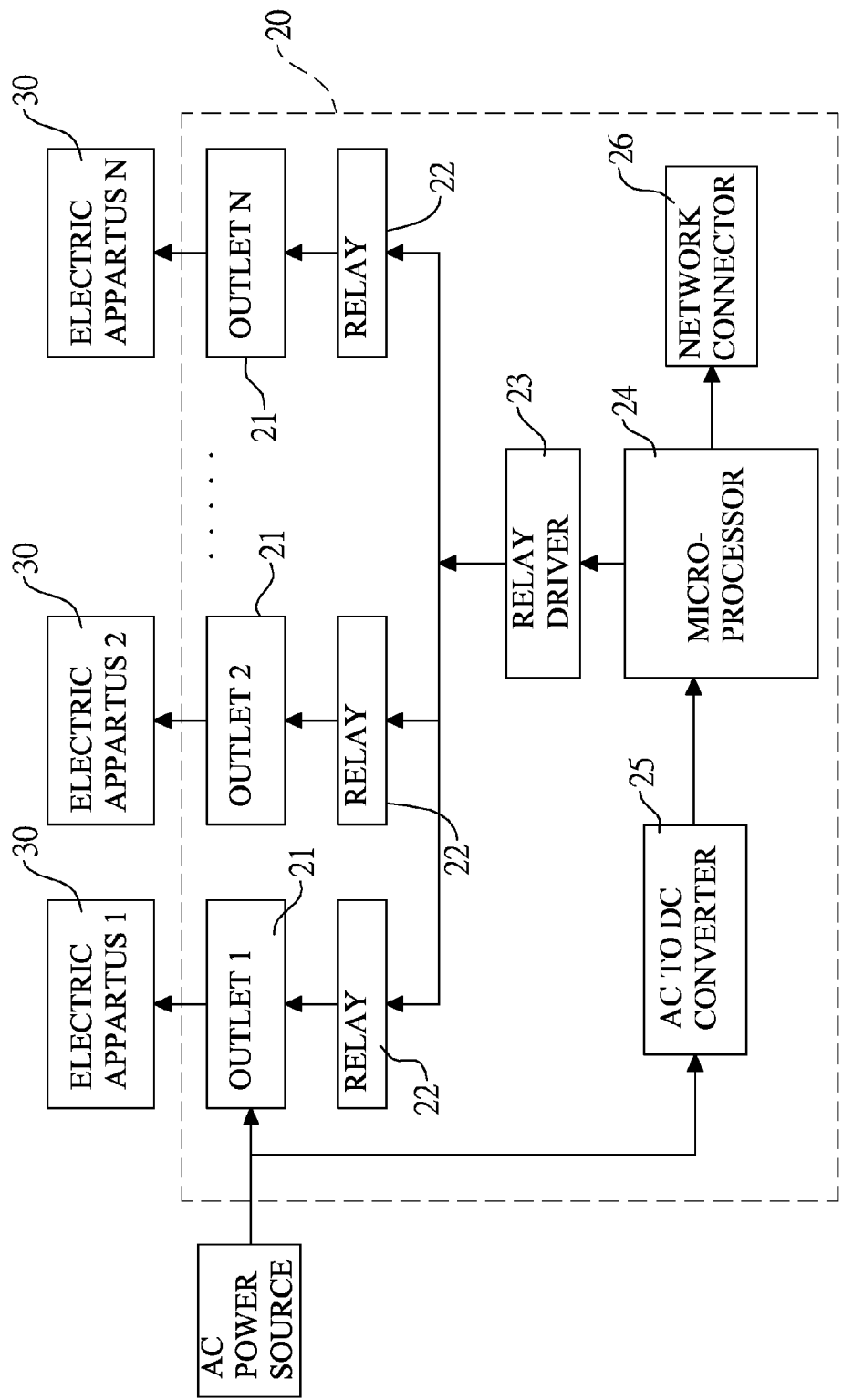
FIG. 2 is functional block view of the PDU of the controlling system in accordance with the present invention.

With further reference to FIG. 2, the PDU 20 has multiple outlets 21, relays 22, a relay driver 23, a microprocessor 24, an AC to DC converter 25 and a network connector 26.

The outlets 21 are connected to an external AC power source and each of which is connected to the corresponding relay 22. The microprocessor 24 drives the relays 22 through the relay driver 23. The AC to DC power converter 24 is connected to the AC power source and the microprocessor 24, and converts the AC power source to DC power source. The DC power source is supplied to the microprocessor 24. The network connector 26 is connected to the microprocessor 24 so the microprocessor 24 links to the computer 10 through the network connector 26 and the network. The microprocessor 24 stores parameters including a turn-off time and a turn-on time for each of the outlets 21.

The electric apparatuses 30, such as computer or server, are respectively connected to the corresponding outlets 21 to have the AC power source, and link to the computer 10. Therefore, the computer 10 obtains the actual shut-down period and actual power-on period of each electric apparatus 30 through the network. In addition, a user also uses an input device of the computer 10 to input the actual shut-down period and power-on period of each electric apparatus 30. When the computer 10 obtains new shut-down period and power-on period of each electric apparatus 30 from the user, the computer 10 will write them back to the corresponding electric apparatus 30.

The controlling interface 11 of the computer 10 has a shut-down option 111 and a power-on option 112. With reference to FIG. 3, the shut-down option 111 of the controlling interface 11 is shown and has outlet numbers, a first main time axis $T_{all}$ having a zero time $t_0$ and an final time T; and multiple variable time axes (ts1 to ts7). A total period of each variable time axis ts1 to ts7 is determined according to the actual shut-down period of corresponding electric apparatus 30. Each variable time axis has a start time and an end time. One of the start time and the end time of each variable time axis ts1 to ts7 is adjusted, but the total period of the variable time axis is fixed and determined according to the actual shut-down period.

If the 7 outlets of the PDU 20 are respectively connected to the corresponding electric apparatuses 30, the computer 10 obtains the actual shut-down period and power-on period of each electric apparatus. Therefore, the total period of each variable time axis ts1 to ts7 is determined and then fixed. The user adjusts the start times S1 to S7 of the variable time axes ts1 to ts7 to determine a first sequence of starting to shut down the electric apparatuses 30. The user also adjusts the end times E1 to E7 of each variable time axis ts1 to ts7 to determine a second sequence of finishing shutting down the electric apparatuses. Once the first sequence or the second sequence is determined finally, other related variable time axes are automatically adjusted to ensure the first and second sequences are not changed if the actual shut-down period of one of the electric apparatus is changed.

When all variable time axes are fixed, the computer 10 calculates the turn-off time te1 to te7 from the zero time t0 to a time t4, t5, t6, t7, t8, t11, t12 on the first main axis $Ta_{ll}$ corresponding to the end time E1 to E7 of each variable time axis ts1 to ts7 (te1=t4−t0; te2=t5−t0 . . . ). Therefore, the turn-off times are sent to the PDU 20. The PDU 20 stores the turn-off times for the corresponding outlets. When the user sends a turn-off command to the PDU 20, PDU 20 sends a shut-down command to the corresponding electric apparatus 30. The electric apparatus 30 will start to shut shown at the start time S1 (t1) of the corresponding variable time axis ts1 and finish shutting down at the end time E1 (t4) of the corresponding variable time axis ts1. The PDU 20 turns off the outlet 1 connected to the electric apparatus 30 at the turn-off time t4.

Figure 4:
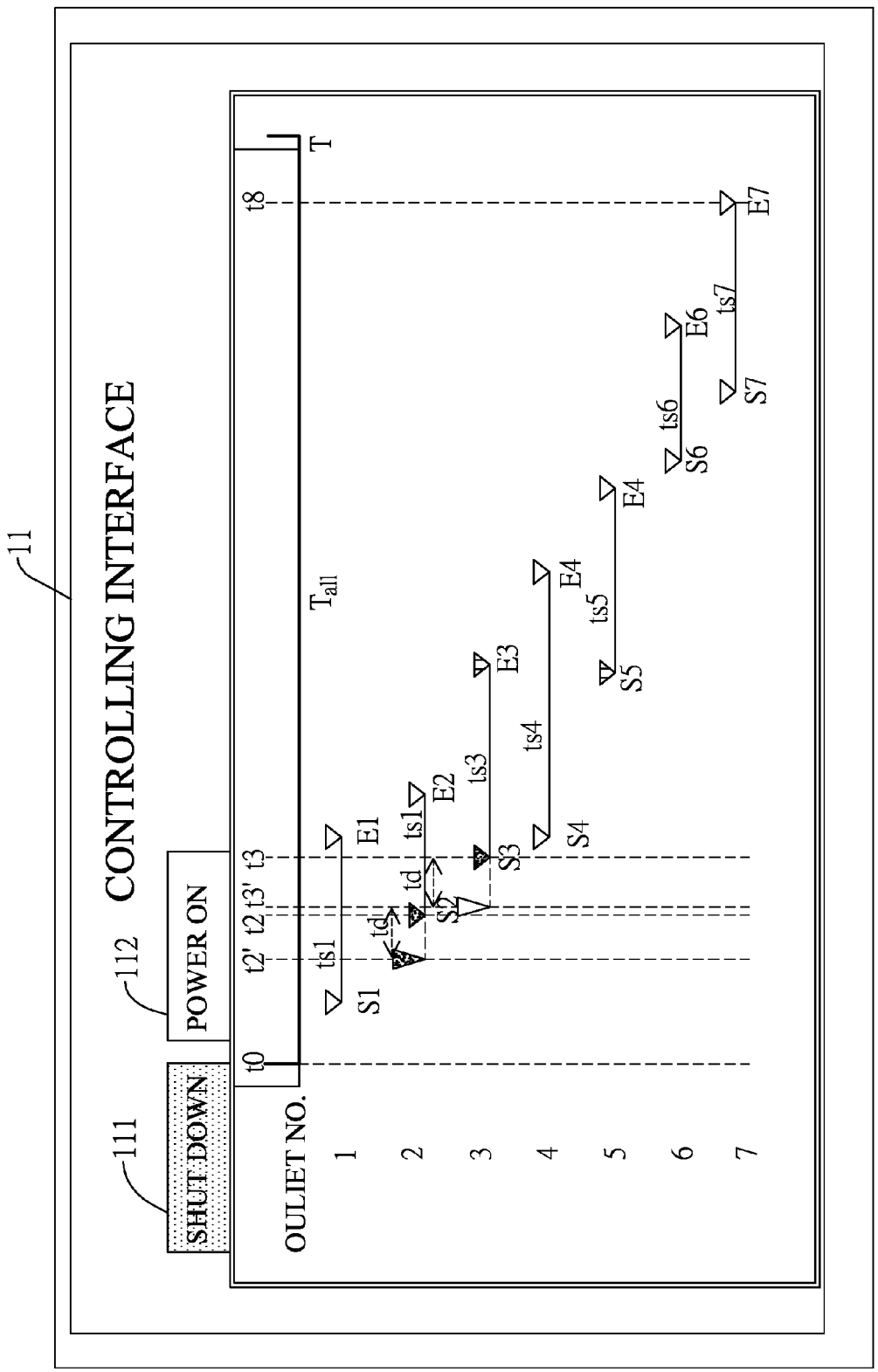
FIG. 4 is another diagram of a controlling interface showing a shut-down procedure in accordance with the present invention.

Furthermore, the electric apparatuses 30 are shut down in the first sequence or the second sequence. The controlling interface 111 further provides a linking function to fix a first time interval between the start times of the two or more variable time axes ts1 to ts7, or fix a second time interval between the end times of the two or more variable time axes ts1 to ts7. The first and second time intervals may be zero. With reference to FIG. 4, for example the start time S3 of the third variable time axis ts3 is linked to the start time S2 of the second variable time axis ts2 so that the first time interval td is fixed. When the user moves one of the start times S2 along the first main axis $T_{all}$, the other start time S3 will be moved in the time interval td. Therefore, the original times t2, t3 on the first main axis corresponding to start time S2, S3 of the second variable time axis are adjusted to a new time t2', t3'. The computer 10 will calculate two new shut-down times and send to the PDU 20. Then, the PDU 20 rewrites the new shut-down times for the second and third outlets 2, 3. Since the first and second sequences are not changed, the start times S1, S4 to S7 of other variable time axes are automatically moved according to the first or second sequence.

In another example, if the start time S5 of the fifth variable axis (L5) is also linked to the end time E3 of the third variable axis ts3, the other one will be moved simultaneously in the same time interval when one of them S5, E3 is moved by the user.

Figure 5:
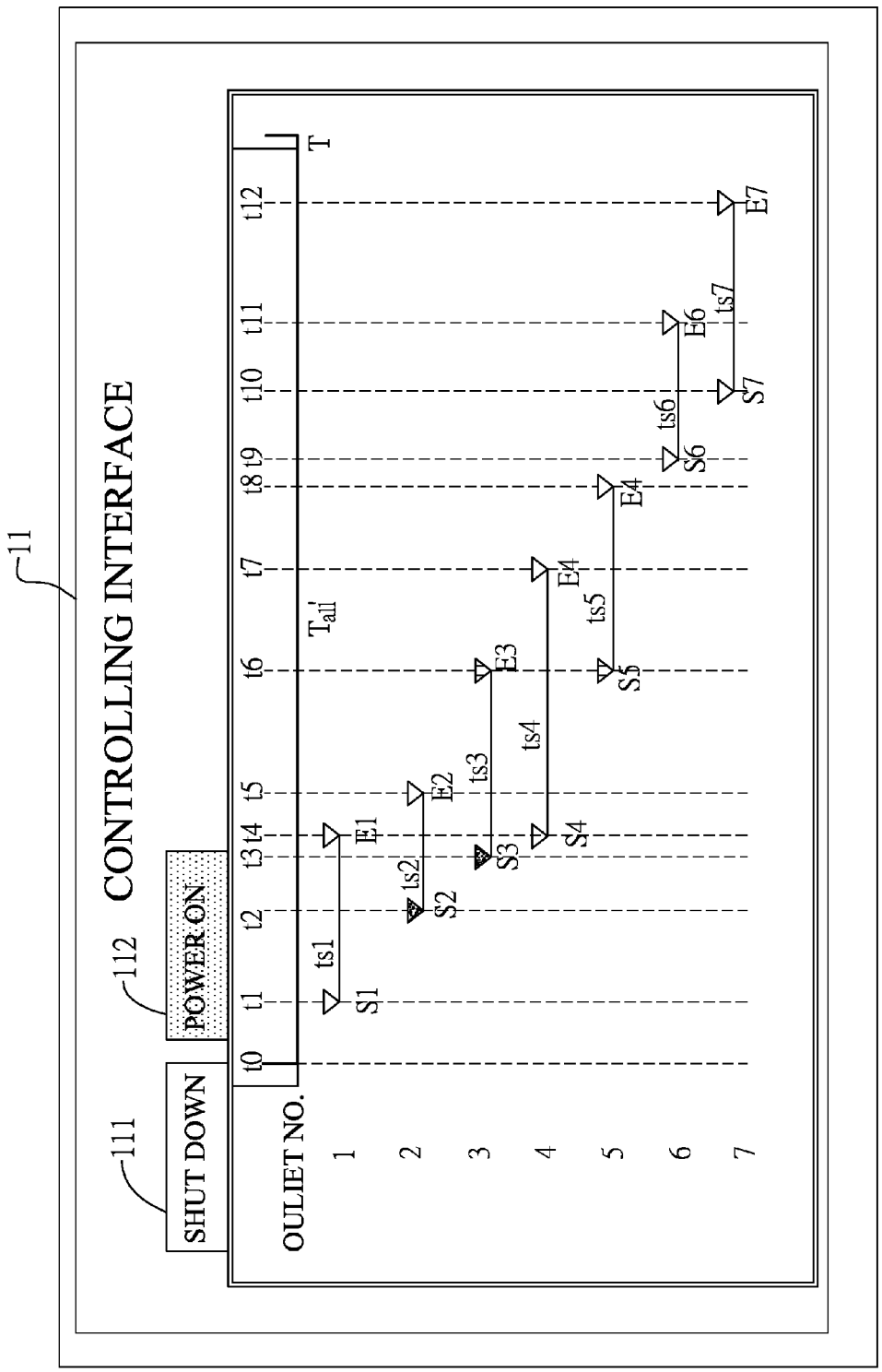
FIG. 5 is a diagram of a controlling interface showing a power-on procedure in accordance with the present invention.
Figure 6:
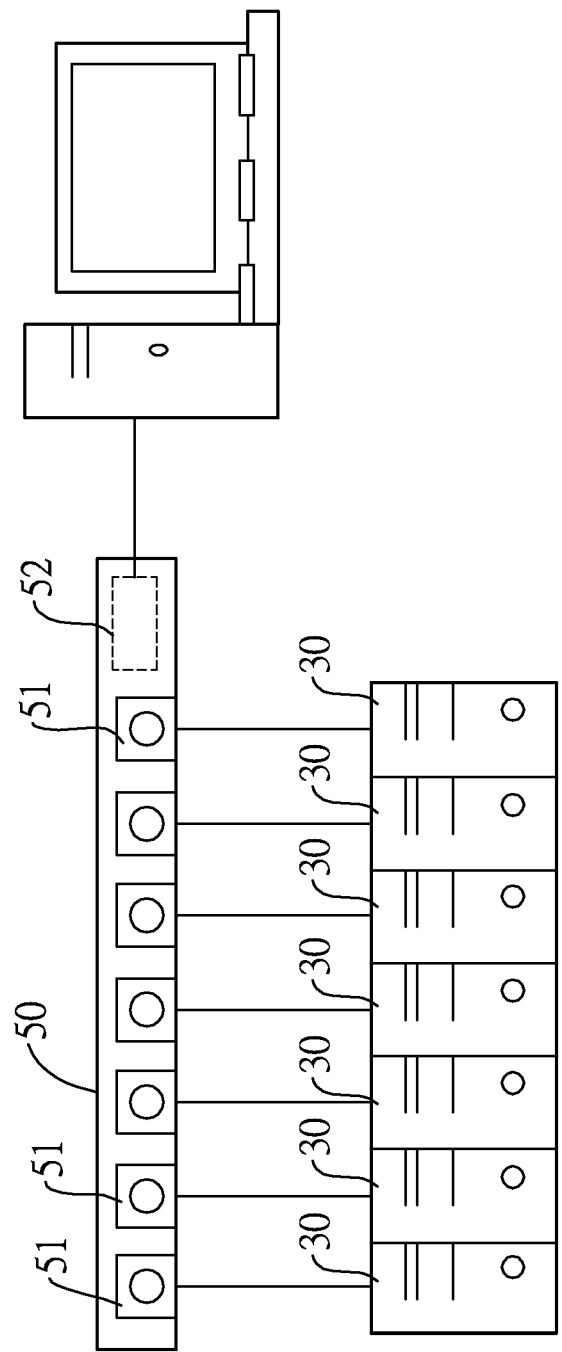
FIG. 6 is a schematic view of a conventional controlling system in accordance with the prior art.

With reference to FIG. 5, the power-on option 112 of the controlling interface 11 is shown and also has outlet numbers 1 to 7, a second main time axis $T_{all}$ and multiple variable time axes ts1 to ts7. The second main time axis $T_{all}$ has a zero time $t_o$ and a final time T; and multiple variable time axes ts1 to ts7. A total period of each variable time axis ts1 to ts7 is determined according to the actual power-on period of corresponding electric apparatus 30. Each variable time axis ts1 to ts7 has a start time S1 TO S7 and an end time E1 to E7. One of the start time S1 to S7 and the end time E1 to E7 of each variable time axis ts1 to ts7 is adjusted, but the total period of the variable time axis ts1 to ts7 is fixed and determined according to the actual power-on period.

Since the computer 10 obtains the actual power-on period of each electric apparatus, the total period of each variable time axis ts1 to ts7 is determined and then fixed. The user adjusts the start times S1 to S7 of the variable time axes ts1 to ts7 to determine a third sequence of starting to power on the electric apparatuses 30. The user also adjusts the end times E1 to E7 of each variable time axis ts1 to ts7 to determine a fourth sequence of finishing powering on the electric apparatuses 30. Once the third sequence or the fourth sequence is determined finally, other related variable time axes are automatically adjusted to ensure the third and fourth sequences are not changed if the actual power-on period of one of the electric apparatus is changed.

When all variable time axes are fixed, the computer 10 calculates the turn-on time te1 to te7 from the zero time t0 to a time t1, t2, t3, t4, t6, t9, t10 on the second main time axis $T_{all}$' corresponding to the start time S1 to S7 of each variable time axis ts1 to ts7 (te1=t1−t0, te2=t2−t0 . . . ). Therefore, the turn-on times are sent to the PDU 20. The PDU 20 stores the turn-on times for the corresponding outlets. When the user sends a turn-on command to the PDU 20, PDU 20 sends a power-on command to the corresponding electric apparatus 30. The electric apparatus 30 will start to power on at the start time S1 (t1) of the corresponding variable time axis ts1 and finish powering on at the end time E1 (t4) of the corresponding variable time axis ts1. Therefore, the PDU 20 turns on the outlet 1 connected to the electric apparatus 30 at the turn-on time t1.

The controlling interface 11 further provides a linking function to fix a third time interval between the start times of the two or more variable time axes ts1 to ts7, or fix a fourth time interval between the end times of the two or more variable time axes ts1 to ts7. The third and forth time intervals may be zero.

Since the PDU and the electric apparatuses are linking to the computer through the network, the turn-off times and turn-on times for the outlets of the PDU are calculated by the computer and then sent to the microprocessor of the PDU through the network. Therefore, the controlling interface of the computer not only provides that the manger can easily preset the outlet's parameter, but also provides a readable diagram to clearly understand.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A controlling system for a power distribution unit (PDU), comprising:
   a computer having a controlling interface and linking to a network;
   a PDU linking to the computer through the network and having multiple outlets, a turn-off time for each outlet; and
   multiple electric apparatuses respectively connected to the corresponding outlets of the PDU to have an AC power source, and linking to the computer and PDU through the network, wherein each electric apparatus stores a shut-down period;
   the controlling interface of the computer having:
      a shut-down option having a first main time axis, multiple outlet numbers corresponding to the outlets of the PDU, and multiple variable time axes respectively corresponding to the outlet number, wherein
      the first main axis has a zero time and a final time; and
      each variable time axis has a total period, a start time and an end time, wherein the total period is determined according to the shut-down period of the electric apparatus for the corresponding the outlet number, and then the turn-off time is further calculated from the zero time to a time on the first main time axis corresponding to the end time of the variable time axis, and the turn-off time is sent to the PDU by the computer, and the start time and the end time are adjustable.

2. The controlling system as claimed in claim 1, wherein the PDU further has a turn-on time for each outlet;
   each electric apparatus stores a power-on period; and
   the controlling interface of the computer further comprises
      a power-on option having a second main time axis, multiple outlet numbers corresponding to the outlets of the PDU, and multiple variable time axes respectively corresponding to the outlet number, wherein
      the second main axis has a zero time and a final time; and
      each variable time axis has a total period, a start time and an end time, wherein the total period is determined according to the power-on period of the electric apparatus for the corresponding the outlet number, and then the turn-on time is further calculated from the zero time to a time on the second main time axis corresponding to the start time of the variable time axis, and the turn-on time is sent to the PDU by the computer, and the start time and the end time are adjustable.

3. The controlling system as claimed in claim 2, wherein the controlling interface further has a linking function to fix a third time interval between the start times of the two or more variable time axes on the power-on option, or fix a second time interval between the end times of the two or more variable time axes on the power-on option.

4. The controlling system as claimed in claim 3, wherein the first and second time intervals may be zero.

5. The controlling system as claimed in claim 4, wherein the PDU comprises:
   multiple relays, each connected to the corresponding outlet;
   a microprocessor driving the relays through a relay driver and storing the turn-off time and the turn-on time of each of the outlet;
   an AC to DC power converter adapted to connect to the AC power source and the microprocessor, and converting the AC power source to DC power source to microprocessor; and
   a network connector connected to the microprocessor.

6. The controlling system as claimed in claim 2, wherein the PDU comprises:
   multiple relays, each connected to the corresponding outlet;
   a microprocessor driving the relays through a relay driver and storing the turn-off time and the turn-on time of each of the outlet;
   an AC to DC power converter adapted to connect to the AC power source and the microprocessor, and converting the AC power source to DC power source to microprocessor; and
   a network connector connected to the microprocessor.

7. The controlling system as claimed in claim 1, wherein the controlling interface further has a linking function to fix a first time interval between the start times of the two or more variable time axes on the shut-down option, or fix a second time interval between the end times of the two or more variable time axes on the shut-down option.

8. The controlling system as claimed in claim 7, wherein the first and second time intervals may be zero.

9. The controlling system as claimed in claim 8, wherein the PDU comprises:
   multiple relays, each connected to the corresponding outlet;
   a microprocessor driving the relays through a relay driver and storing the turn-off time of each of the outlet;
   an AC to DC power converter adapted to connect to the AC power source and the microprocessor, and converting the AC power source to DC power source to microprocessor; and
   a network connector connected to the microprocessor.

10. The controlling system as claimed in claim 1, wherein the PDU further comprises:
   multiple relays, each connected to the corresponding outlet;
   a microprocessor driving the relays through a relay driver and storing the turn-off time and the turn-on time of each of the outlet;

an AC to DC power converter adapted to connect to the AC power source and the microprocessor, and converting the AC power source to DC power source to microprocessor; and a network connector connected to the microprocessor.

* * * * *